2,901,487

LOWER-ALKYL 4-PHENYL-1-(HIGHER-ALKYL)-PIPERIDINE-4-CARBOXYLATES AND THEIR PREPARATION

Bill Elpern, Walnut Creek, Calif., assignor to Sterling Drug Inc., New York, N.Y., a corporation of Delaware No Drawing. Application September 9, 1957
Serial No. 682,639

17 Claims. (Cl. 260—293.4)

This invention relates to compositions of matter of the class of substituted-piperidines and to the preparation of these compounds.

The invention here resides in the concept of a composition having a molecular structure in which a higher-alkyl radical having six to nine carbon atoms is attached to the nitrogen atom of the piperidine ring of lower-alkyl 4-phenyl-piperidine-4-carboxylates and to a process for physically embodying such concept.

The compositions of my invention have valuable pharmacodynamic properties, in particular, analgesic activity.

One of the most widely used and accepted analgesics of commerce is ethyl 4-phenyl-1-methylpiperidine-4-carboxylate, which is sold as hydrochloride salt, known in the United States as meperidine hydrochloride and in England as pethidine hydrochloride. This composition originally had been reported by Schaumann in 1940 [Arch. exptl. Path. Pharmakol. 196, 109 (1940)], as the analgesic of choice of a large series of piperidines studied, including corresponding homologs having ethyl, n-propyl or butyl substituents at the 1-position of the piperidine ring in place of methyl. Actually, Schaumann reported these homologs to be less active than the 1-methyl compound of choice.

Later, Thorp and Walton also investigated 1-alkyl homologs of meperidine hydrochloride for analgesic properties, including the 1-ethyl, 1-n-propyl, 1-isopropyl, 1-n-butyl, 1-(2-butyl), 1-n-amyl and 1-(1'-methylbutyl) derivatives, and found that "analgesic activity increases slightly up to the n-propyl compound" and concluded "that the N-alkyl homologues of pethidine, although some show slightly greater activity as analgesics, are not sufficiently different from, or more potent than, pethidine to prove of greater value" [J. Chem. Soc. 1948, 559].

The findings of Schaumann and of Thorp et al. would thus lead investigators away from 1-alkyl homologs of meperidine and away from compounds such as those of my invention.

I have now prepared lower-alkyl 4-phenyl-1-(higher-alkyl)piperidine-4-carboxylates where the lower-alkyl radical has from one to four carbon atoms inclusive and where the 1-(higher-alkyl) substituent has from six to nine carbon atoms inclusive and surprisingly found them to be appreciably more effective as analgesics than meperidine hydrochloride. For example, when tested intraperitoneally in rats by the Bass-Vander Brook modification of the D'Amour-Smith method [J. Am. Pharm. Assoc., Sci. Ed., 41, 569–570 (1952)], ethyl 4-phenyl-1-n-heptylpiperidine-4-carboxylate hydrochloride is approximately six and one-half times more active than the corresponding lower 1-methyl homolog, i.e., meperidine hydrochloride; and the corresponding 1-n-hexyl, 1-n-octyl and 1-n-nonyl homologs are approximately four and one-half, four, and two and one-half times, respectively, more active than meperidine hydrochloride. The toxicities of these compounds are less than the toxicity of meperidine at equipotent doses.

My compounds in free base form have the structural Formula I

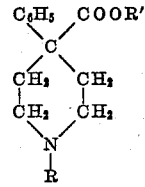

where R' is a lower-alkyl radical having from one to four carbon atoms inclusive and R is a higher-alkyl radical having from six to nine carbon atoms inclusive.

The lower-alkyl radical designated in Formula I as R' is illustrated by methyl, ethyl, n-propyl, isopropyl, n-butyl, isobutyl or 2-butyl. The higher-alkyl radical designated above as R can be either straight-chained or branch-chained.

The compounds of this invention are prepared by reacting a lower-alkyl 4-phenylpiperidine-4-carboxylate with a higher-alkyl ester of a strong inorganic or an organic sulfonic acid. Suitable higher-alkyl esters are illustrated by n-hexyl, n-heptyl or n-octyl bromide, chloride, iodide, sulfate, methanesulfonate, benzenesulfonate, para-toluenesulfonate, or the like, with the bromides being preferred. The reaction is carried out by heating the lower-alkyl 4-phenylpiperidine-4-carboxylate with the higher-alkyl ester, e.g., bromide, in the presence or absence of a suitable solvent, but preferably in the presence of a solvent such as a lower alkanol, e.g., n-butanol. The reaction is generally carried out at a temperature between about 50° C. and 150° C., preferably at reflux in a lower alkanol solvent. As a specific illustration of my invention, ethyl 4-phenyl-1-n-heptylpiperidine-4-carboxylate is obtained by heating ethyl 4-phenylpiperidine-4-carboxylate with n-heptyl bromide, preferably in refluxed n-butanol with stirring in the presence of an alkaline agent such as sodium carbonate to neutralize the hydrogen bromide formed by the reaction. Since the preferred intermediate, ethyl 4-phenylpiperidine-4-carboxylate forms an insoluble carbonate when treated with carbon dioxide, a convenient way of ascertaining whether the reaction is complete or not is merely to treat the reaction mixture with carbon dioxide, the absence of a precipitate indicating completeness of the reaction. The product is isolated in free base form or in the form of its acid-addition salt.

My new lower-alkyl 4-phenyl-1-(higher-alkyl)piperidine-4-carboxylates are useful in the free base form or in the form of acid-addition salts, and both forms are within the purview of the invention. The acids which can be used to prepare acid-addition salts are preferably those which produce, when combined with the free base, pharmacodynamically acceptable salts, that is, salts whose anions are relatively innocuous to an animal organism in pharmacodynamic doses of the salts, so that the beneficial physiological properties inherent in the free base are not vitiated by side effects ascribable to the anions; in other words, the latter do not substantially affect the pharmacodynamic properties inherent in the cations. In practicing my invention, I found it convenient to employ the hydrochloride, ethanesulfonate or methanesulfonate salts. However, other appropriate pharmacodynamically acceptable acid-addition salts are those derived from mineral acids such as hydrobromic acid, hydriodic acid, nitric acid, phosphoric and sulfuric acid; and organic acids such as acetic acid, citric acid, tartaric acid, lactic acid, quinic acid, and the like, giving the hydrobromide, hydriodide, nitrate, phosphate, sulfate, acetate, citric, tartrate, lactate and quinate salts, respectively.

The acid-addition salts are prepared either by dissolving the free base in an aqueous solution containing the appropriate acid and isolating the salt by evaporating the solution, or by reacting the free base and acid in an organic solvent, in which case the salt separates directly or can be obtained by concentration of the solution.

Although pharmacodynamically acceptable salts are preferred, all acid-addition salts are within the scope of my invention. All acid-addition salts are useful as sources of the free base form even if the particular salt per se is not desired as the final product, as for example when the salt is formed only for purposes of purification or identification, or when it is used as an intermediate in preparing a pharmacodynamically acceptable salt by ion exchange procedures.

The molecular structures of my compounds are established by their mode of synthesis and corroborated by the correspondenec of calculated and found values for the elementary analyses for representative examples.

The following examples will further illustrate the invention without, however, limiting it thereto.

EXAMPLE 1

*Lower-alkyl 4-phenyl-1-n-octylpiperidine-4-carboxylates*

The preparation of these compounds is illustrated by the following preparation of ethyl 4-phenyl-1-n-octyl- piperidine-4-carboxylate: A mixture of 13.5 g. of ethyl 4-phenylpiperidine-4-carboxylate hydrochloride, 9.66 g. of n-octyl bromide, 20 g. of sodium carbonate and 100 ml. of n-butanol was heated at reflux for twenty-four hours. The reaction mixture was filtered, the filtrate treated with a small piece of Dry Ice (the absence of a precipitate indicating that no intermediate secondary amine was present), and then concentrated in vacuo to dryness. The residue [ethyl 4-phenyl-1-n-octylpiperidine- 4-carboxylate in free base form] was taken up in methanol; the resulting solution was made acidic with concentrated hydrochloric acid; and ether was added to yield a white precipitate. The precipitate was collected and recrystallized from ethanol-ether to give 13 g. (68% yield) of the product, ethyl 4-phenyl-1-n-octylpiperidine- 4-carboxylate hydrochloride. A sample for analysis melted at 137.0–138.0° C. (corr.) when recrystallized from water and dried at 85° C.

*Analysis.*—Calcd. for $C_{22}H_{35}NO_2 \cdot HCl$: C, 69.16; H, 9.50; Cl, 9.28. Found: C, 69.44; H, 9.09; Cl, 8.99.

The above-described preparation can also be carried out using ethyl 4-phenylpiperidine-4-carboxylate in free base form and a reduced quantity (about one-half as much) sodium carbonate. Alternatively, this preparation can be carried out using other n-octyl esters such as n-octyl para-toluenesulfonate, n-octyl sulfate or n-octyl chloride in place of n-octyl bromide.

Pharmacological evaluation of ethyl 4-phenyl-1-n-octyl- piperidine-4-carboxylate hydrochloride in aqueous solution administered intraperitoneally by the rat thermal stimulus method of Bass and Vander Brook, ibid., has shown that this compound is approximately four times as active an analgesic as ethyl 4-phenyl-1-methylpiperi- dine-4-carboxylate hydrochloride.

Following the above procedure but using methyl 4-phenylpiperidine-4-carboxylate, n-propyl 4-phenylpiperi- dine-4-carboxylate, isopropyl 4-phenylpiperidine-4-car- boxylate, isobutyl 4-phenylpiperidine-4-carboxylate or n-butyl 4-phenylpiperidine-4-carboxylate in place of ethyl 4-phenylpiperidine-4-carboxylate, there is obtained methyl 4-phenyl-1-n-octylpiperidine-4-carboxylate, n-propyl 4-isopropyl 4 - phenyl - 1 - n - octylpiperidine-4-carboxylate, phenyl - 1 - n - octylpiperidine-4-carboxylate, isopropyl 4-phenyl-1-n-octylpiperidine-4-carboxylate or n-butyl 4-phenyl - 1 - n - octylpiperidine-4-carboxylate, respectively, which are isolated in free base form or as their acid- addition salts, preferably the hydrochlorides or alkane- sulfonates.

The preparation of an ethanesulfonate is illustrated by the following preparation of ethyl 4-phenyl-1-n-otcyl- piperidine-4-carboxylate ethanesulfonate: A mixture of 54 g. of ethyl 4-phenylpiperidine-4-carboxylate hydro- chloride, 38.6 g. of n-octyl bromide, 70 g. of sodium car- bonate and 500 cc. of n-butanol was refluxed for about fifteen hours; and allowed to cool to room temperature. The precipitated salt was filtered off and washed with n-butanol. The washings were combined with the fil- trate of the reaction mixture and the resulting solution was concentrated on a steam bath under reduced pres- sure. Additional salt that separated was removed by filtration and removal of the n-butanol was continued until there remained a viscous residue which contained ethyl 4-phenyl-1-n-octylpiperidine-4-carboxylate in free base form. This residue was taken up in dry acetone and to the solution was added a solution of 22 g. of ethanesulfonic acid in acetone. The resulting solution was placed in an acetone-Dry Ice bath. The precipitate that separated was collected and placed in a vacuum desiccator over calcium chloride. There was obtained 65 g. of product which was slurried with ether, filtered and dried at 65° C., yielding about 58 g. of purified ethyl 4-phenyl-1-n-octylpiperidine-4-carboxylate ethanesulfon- ate, M.P. 86.2–88.2° C. (corr.).

*Analysis.*—Calcd. for $C_{22}H_{35}NO_2 \cdot C_2H_5SO_3H$: $C_2H_5SO_3H$, 24.1. Found: $C_2H_5SO_3H$, 24.13.

EXAMPLE 2

*Ethyl 4-phenyl-1-n-heptylpiperidine-4-carboxylate*

This preparation was carried out following the pro- cedure described in Example 1 using 8.95 g. of n-heptyl bromide in place of the n-octyl bromide. There was thus obtained 14.3 g. (78% yield) of the product, ethyl 4-phenyl-1-n-heptylpiperidine-4-carboxylate in the form of its hydrochloride, M.P. 146.4–149.0° C. (corr.) when recrystallized from benzene-cyclohexane.

*Analysis.*—Calcd. for $C_{21}H_{33}NO_2 \cdot HCl$: C, 68.54; H, 9.31; Cl, 9.64. Found: C, 68.40; H, 9.26; Cl, 9.49.

Pharmacological evaluation of ethyl 4-phenyl-1-n-hep- tylpiperidine-4-carboxylate hydrochloride in aqueous so- lution administered intraperitoneally by the rat thermal stimulus method of Bass and Vander Brook, ibid., has shown that this compound is approximately six and one- half times as active an analgesic as ethyl 4-phenyl-1- methylpiperidine-4-carboxylate hydrochloride.

EXAMPLE 3

*Ethyl 4-phenyl-1-n-hexylpiperidine-4-carboxylate*

This preparation was carried out following the pro- cedure described in Example 1 using 8.25 g. of n-hexyl bromide instead of the n-octyl bromide. There was thus obtained 8.6 g. (49% yield) of ethyl 4-phenyl-1-n-hexyl- piperidine-4-carboxylate in the form of its hydrochloride, M.P. 160.0–161.4° C. (corr.) when recrystallized twice from benzene-cyclohexane.

*Analysis.*—Calcd. for $C_{20}H_{31}NO_2 \cdot HCl$ C, 67.87; H, 9.12; Cl, 10.02. Found: C, 67.81; H, 9.10, Cl, 10.02.

Pharmacological evaluation of ethyl 4-phenyl-1-n- hexylpiperidine-4-carboxylate hydrochloride in aqueous solution administered intraperitoneally by the rat thermal stimulus method of Bass and Vander Brook, ibid., has shown that this compound is approximately four and one-half times as active an analgesic as ethyl 4-phenyl-1- methylpiperidine-4-carboxylate hydrochloride.

EXAMPLE 4

*Ethyl 4-phenyl-1-n-nonylpiperidine-4-carboxylate*

This preparation was carried out following the proce- dure described in Example 1 using 10.35 g. of n-nonyl bromide instead of the n-octyl bromide. There was thus obtained 8.5 g. (43% yield) of ethyl 4-phenyl-1-n-nonyl-piperidine-4-carboxylate in the form of its hydrochloride, M.P. 132.4–134.2° C. (corr.) when recrystallized once from ethyl acetate and once from benzenecyclohexane.

Analysis.—Calcd. for $C_{23}H_{37}NO_2 \cdot HCl$: C, 69.76; H, 9.67; Cl, 8.95. Found: C, 69.58; H, 9.47; Cl, 8.77.

Pharmacological evaluation of ethyl-4-phenyl-1-n-nonylpiperidine-4-carboxylate hydrochloride in aqueous solution administered intraperitoneally by the rat thermal stimulus method of Bass and Vander Brook, ibid., has shown that this compound is approximately two and one-half times as active an analgesic as ethyl 4-phenyl-1-methylpiperidine-4-carboxylate hydrochloride.

EXAMPLE 5

Ethyl 4-phenyl-1-(2-hexyl)piperidine-4-carboxylate

This preparation was carried out following the procedure described in Example 1 for the preparation of ethyl 4-phenyl-1-n-octylpiperidine-4-carboxylate ethanesulfonate using 27 g. of ethyl 4-phenylpiperidine-4-carboxylate hydrochloride, 16.5 g. of 2-hexyl bromide, 35 g. of sodium carbonate and 300 cc. of n-butanol. There was thus obtained 20 g. of the product, ethyl 4-phenyl-1-(2-hexyl)piperidine-4-carboxylate in the form of its methane-sulfonate, M.P. 84.2° C.–indefinite (corr.) after one recrystallization from isopropanol-ether.

Analysis.—Calcd. for $C_{20}H_{21}NO_2 \cdot CH_3SO_3H$: O, 19.34; N, 3.38. Found: O, 19.60; N, 3.52.

Pharmacological evaluation of ethyl 4-phenyl-1-(2-hexyl)piperidine-4-carboxylate methanesulfonate in aqueous solution administered intraperitoneally by the rat thermal stimulus method of Bass and Vander Brook, ibid., has shown that this compound is approximately six and one-half times as active an analgesic as ethyl 4-phenyl-1-methylpiperidine-4-carboxylate hydrochloride.

EXAMPLE 6

Ethyl 4-phenyl-1-(3-heptyl)piperidine-4-carboxylate

This preparation was carried out following the procedure described in Example 1 using 27 g. of ethyl 4-phenylpiperidine-4-carboxylate hydrochloride, 18 g. of 3-heptyl bromide, 35 g. of sodium carbonate and 300 cc. of n-butanol, with a reflux period of about sixteen hours. There was thus obtained 3.0 g. of the product, ethyl 4-phenyl-1-(3-heptyl)piperidine-4-carboxylate in the form of its hydrochloride, M.P. 145.0–147.4° C. (corr.) when recrystallized from isopropanol.

Analysis.—Calcd. for $C_{21}H_{33}NO_2 \cdot HCl$: Cl, 9.63; O, 8.69. Found: Cl, 9.54; O, 8.70.

Pharmacological evaluation of ethyl 4-phenyl-1-(3-heptyl)piperidine-4-carboxylate hydrochloride in aqueous solution administered intraperitoneally by the rat thermal stimulus method of Bass and Vander Brook, ibid., has shown that this compound is approximately three times as active an analgesic as ethyl 4-phenyl-1-methylpiperidine-4-carboxylate hydrochloride.

My lower-alkyl 4-phenyl-1-(higher-alkyl)piperidine-4-carboxylates can be formulated in the same manner as meperidine, e.g., in aqueous or aqueous-ethanol menstruum, or in solid form, e.g., tablet or powder. The tablet formulation can be prepared using conventional excipients, and the powder can be compounded in capsule form. These preparations can be administered orally or, in the case of aqueous preparations, intramuscularly or intravenously.

I claim:

1. A composition of matter selected from the group consisting of lower-alkyl 4-phenyl-1-(higher-alkyl)piperidine-4-carboxylates where the lower-alkyl radical has from one to four carbon atoms inclusive and the higher-alkyl radical has from six to nine carbon atoms inclusive, and acid-addition salts thereof.

2. Ethyl 4-phenyl-1-(higher-alkyl)piperidine-4-carboxylate where the higher-alkyl radical has from six to nine carbon atoms inclusive.

3. An acid-addition salt of ethyl 4-phenyl-1-(higher-alkyl)piperidine-4-carboxylate where the higher-alkyl radical has from six to nine carbon atoms inclusive.

4. An acid-addition salt of ethyl 4-phenyl-1-n-octyl-piperidine-4-carboxylate.

5. Ethyl 4-phenyl-1-n-octylpiperidine-4-carboxylate hydrochloride.

6. An acid-addition salt of ethyl 4-phenyl-1-n-heptyl-piperidine-4-carboxylate.

7. Ethyl 4 - phenyl - 1 - n - heptylpiperidine - 4 - carboxylate hydrochloride.

8. An acid-addition salt of ethyl 4-phenyl-1-n-hexyl-piperidine-4-carboxylate.

9. Ethyl 4 - phenyl - 1 - n - hexylpiperidine - 4 - carboxylate hydrochloride.

10. An acid addition salt of ethyl 4-phenyl-1-(2-hexyl)piperidine-4-carboxylate.

11. Ethyl 4 - phenyl - 1 - (2 - hexyl)piperidine - 4 - carboxylate methanesulfonate.

12. The process of preparing a lower-alkyl 4-phenyl-1-(higher-alkyl)piperidine-4-carboxylate where the lower-alkyl radical has from one to four carbon atoms inclusive and the higher-alkyl radical has from six to nine carbon atoms inclusive, which comprises reacting a lower-alkyl 4-phenylpiperidine-4-carboxylate with a higher-alkyl ester of an acid selected from the group consisting of a strong inorganic acid and an organic sulfonic acid.

13. The process of preparing an ethyl 4-phenyl-1-(higher-alkyl)piperidine-4-carboxylate where the higher-alkyl radical has from six to nine carbon atoms inclusive, which comprises reacting ethyl 4-phenylpiperidine 4-carboxylate with a higher-alkyl halide.

14. The process of preparing ethyl 4-phenyl-1-n-octyl-piperidine-4-carboxylate which comprises reacting ethyl 4-phenylpiperidine-4-carboxylate with n-octyl bromide.

15. The process of preparing ethyl 4-phenyl-1-n-heptylpiperidine-4-carboxylate which comprises reacting ethyl 4-phenylpiperidine-4-carboxylate with n-heptyl bromide.

16. The process of preparing ethyl 4-phenyl-1-n-hexyl-piperidine-4-carboxylate which comprises reacting ethyl 4-phenylpiperidine-4-carboxylate with n-hexyl bromide.

17. The process of preparing ethyl 4-phenyl-1-(2-hexyl)piperidine-4-carboxylate which comprises reacting ethyl 4-phenylpiperidine-4-carboxylate with 2-hexyl bromide.

References Cited in the file of this patent

UNITED STATES PATENTS 2,167,351    Eisleb _____ July 25, 1939

OTHER REFERENCES

Thorp et al.: J. Chem. Society, London, part II, May 1948, pp. 559–561.

Elpern: Abstr. Papers, 130th Meeting of Am. Chem. Soc., September 1956, 7N No. 11.

UNITED STATES PATENT OFFICE
CERTIFICATE OF CORRECTION

Patent No. 2,901,487            August 25, 1959

Bill Elpern

It is hereby certified that error appears in the printed specification of the above numbered patent requiring correction and that the said Letters Patent should read as corrected below.

Column 1, line 31, for "composition" read -- compound --; column 3, line 19, for "correspondenec" read -- correspondence --; lines 70 and 71, strike out "4-isopropyl"; line 72, before "phenyl-" insert -- isopropyl 4- --; same line 72, for "isopropyl" read -- isobutyl --; column 4, line 4, for "-n-otcyl-" read -- -n-octyl- --.

Signed and sealed this 17th day of May 1960.

(SEAL)
Attest:

KARL H. AXLINE            ROBERT C. WATSON
Attesting Officer            Commissioner of Patents